United States Patent [19]
Pirkle

[11] Patent Number: 5,623,990
[45] Date of Patent: Apr. 29, 1997

[54] TEMPERATURE-CONTROLLED WATER DELIVERY SYSTEM

[75] Inventor: Fred L. Pirkle, Abington, Pa.

[73] Assignee: Texan Corporation, Horsham, Pa.

[21] Appl. No.: 552,792

[22] Filed: Nov. 3, 1995

[51] Int. Cl.$^6$ ............................. B60H 1/00; G05D 23/00
[52] U.S. Cl. .............................. 165/298; 165/294; 4/676; 236/12.2
[58] Field of Search ................................ 236/12.2, 12.11, 236/18, 19; 4/676, 597; 165/39, 40, 294, 298, 299

[56] References Cited

U.S. PATENT DOCUMENTS

| | | | |
|---|---|---|---|
| 2,455,498 | 12/1948 | Kern | 236/12.22 X |
| 2,610,837 | 9/1952 | Puster | 236/12.11 X |
| 3,232,336 | 2/1966 | Leslie et al. | 236/12.11 X |

*Primary Examiner*—William E. Wayner
*Attorney, Agent, or Firm*—Howson and Howson

[57] ABSTRACT

A combined safety shower and eyewash station utilizes steam to heat water in a heat exchanger. Cool water is combined with heated water from the water outlet of the heat exchanger by a temperature-regulated mixing valve. If the water at the water outlet of the heat exchanger becomes too hot, some of the water is fed to the steam inlet of the heat exchanger. This makes it easy for the mixing valve to regulate water temperature even though the shower uses water at a much higher rate than does the eyewash station. Steam is fed to the heat exchanger through a steam valve which is opened automatically when a demand for warm water is sensed by a pressure-drop flow sensor. An overtemperature responsive actuator overrides the demand sensor to shut off the steam. A steam trap at the inlet of the steam valve eliminates cold condensate so that the apparatus is able to deliver warm water substantially immediately upon demand.

22 Claims, 5 Drawing Sheets

TEMPERATURE-CONTROLLED WATER DELIVERY SYSTEM

BRIEF SUMMARY OF THE INVENTION

This invention relates generally to temperature-controlled water delivery systems, and more particularly to a tankless water delivery system for delivering water at a controlled temperature selectively through two different delivery paths at different flow rates. This water delivery system has particular utility in combined safety shower-eyewash stations.

Safety showers and eyewash stations are mandated in chemical plants and in other facilities in which workers are subject to injury from corrosive or toxic substances. It is important to maintain the temperature of the water delivered by the shower and by the eye wash station within narrow temperature limits close to the optimum temperature of 85° F. 105° F. is considered to be the maximum safe temperature.

Frequently safety showers and eyewash stations are situated outdoors, where they are affected by ambient temperatures. To maintain the water at the optimum temperature is especially difficult in an outdoor environment, where ambient temperatures can vary. Variations in the temperature of the water supply can also cause difficulties in the regulation of the temperature of the delivered water. Typically, water is stored in tanks, and held at the desired temperature by heating equipment with appropriate temperature sensing controls. One of the problems with this approach is that substantial amounts of energy are consumed to insure that the water will be at the desired temperature immediately upon delivery. Another problem is that the temperature of the water is difficult to control when ambient temperatures vary widely. It is also difficult to hold the delivered water at a constant temperature over a long interval of time, unless a large tank is used. Still another problem is that failure of the heating equipment or of the regulating apparatus can cause the delivered water to be either dangerously hot or intolerably cold.

It is possible to use steam lines to warm the water in showers or eyewash stations through heat exchangers, thereby eliminating the need for storage tanks. However, showers and eyewash stations have widely differing water flow rates. Therefore, using known steam heating techniques, if a single heat exchanger were used, shower water would be delivered too cold and/or eyewash water would be delivered too hot. Consequently, if conventional steam heating techniques were used, it would be necessary to provide separate heat exchangers and separate controls for the each shower and each eyewash station.

The principal object of this invention is to provide a simple and reliable system for delivering warm water at a controlled temperature at either of two widely differing flow rates. It is also an object of the invention to deliver warm water at a controlled temperature at either of two widely varying flow rates from a water supply at a low pressure. Another object is to avoid excessive energy consumption in such a system. Another object is to insure in such a system that the water will be at the desired temperature immediately upon delivery. Another object is to control such a system so that it reliably delivers water at a desired temperature even when ambient temperatures and cool water supply temperatures vary widely. Another object is to hold the water delivered by such a system at a constant temperature over a long interval of time without the need for a water storage tank. Still another object of the invention is to provide a fail-safe system so that the delivered water will be neither dangerously hot nor intolerably cold. It is also an object of the invention to provide an inexpensive and reliable combined shower and eyewash station.

The apparatus in accordance with this invention preferably comprises a heat exchanger having a water path, a steam path separate from the water path, and means for transferring heat from the steam path to the water path. Cool water is fed from a water supply to the inlet of the water path of the heat exchanger, and steam is fed to the inlet of the steam path of the heat exchanger. A combiner, preferably a mixing valve, combines cool water from the cool water feed with heated water from the outlet of the water path of the heat exchanger, to deliver warm water.

The flow of the warm water is selectably controllable so that it can flow at least at two different flow rates. For example, in one application of the apparatus, two delivery paths are provided, one being to a safety shower and the other being to an eyewash station. The safety shower, of course, uses water at a greater rate than does the eyewash station. Each delivery path has its own shut-off valve.

A by-pass path is provided for the flow of water from the outlet of the water path of the heat exchanger to the inlet of the steam path of the heat exchanger, and a temperature-responsive valve is provided to allow water to flow through the by-pass path from the water outlet of the heat exchanger to the steam inlet of the heat exchanger when the temperature of the water at the water outlet exceeds a predetermined limit. The operation of the heat exchanger is rapidly spoiled by the flow of water through the by-pass path into the steam inlet. The rapid spoiling of the operation of the heat exchanger makes the temperature of the warm water delivered by the combiner less sensitive to the rate of flow of the warm water and therefore more easily regulated in the combiner so that it is maintained at a substantially constant temperature.

Except when there is a demand for warm water, the steam supply is normally either shut off, or throttled down to a low rate of flow, by a steam valve. The steam valve is preferably controlled by a diaphragm actuator connected to two points along the water path having a flow restriction between them. The diaphragm is responsive to the pressure drop across the restriction, and opens the steam valve when the pressure drop is sensed as a demand for warm water occurs.

The flow of steam to the inlet of the steam path of the heat exchanger is also reduced when the temperature of the water delivered through the outlet of the water path of the heat exchanger exceeds a predetermined temperature. Preferably, this is achieved by placing an overtemperature sensor in the heat-exchanger by-pass path, and using the temperature sensor to control the flow of steam to the heat exchanger. The steam valve is preferably a single valve controlled both by the warm water demand sensor and by the overtemperature sensor, the latter being capable of overriding the demand sensor, so that the steam valve can be shut off if an overtemperature condition occurs while the demand sensor is sensing a demand for warm water.

To keep the system ready to respond immediately to a demand for warm water, a steam trap is connected to the steam supply line near the inlet of the steam valve to eliminate condensate. Thus, upon opening of the steam valve, steam is able to flow to the heat exchanger substantially immediately.

This apparatus provides a combined eyewash and safety shower which delivers water at 85° F. immediately upon demand, and which regulates the water temperature reliably despite the great differences in water flow rates through the shower and the eyewash station.

Further objects, details and advantages of the invention will be apparent from the following description when read in conjunction with the drawings.

DETAILED DESCRIPTION

In a typical industrial plant in which workers are exposed to corrosive or toxic chemicals, safety showers and eyewash stations are provided at appropriate locations where they can be reached readily by workers who accidentally come into contact with such chemicals.

Figure 1:
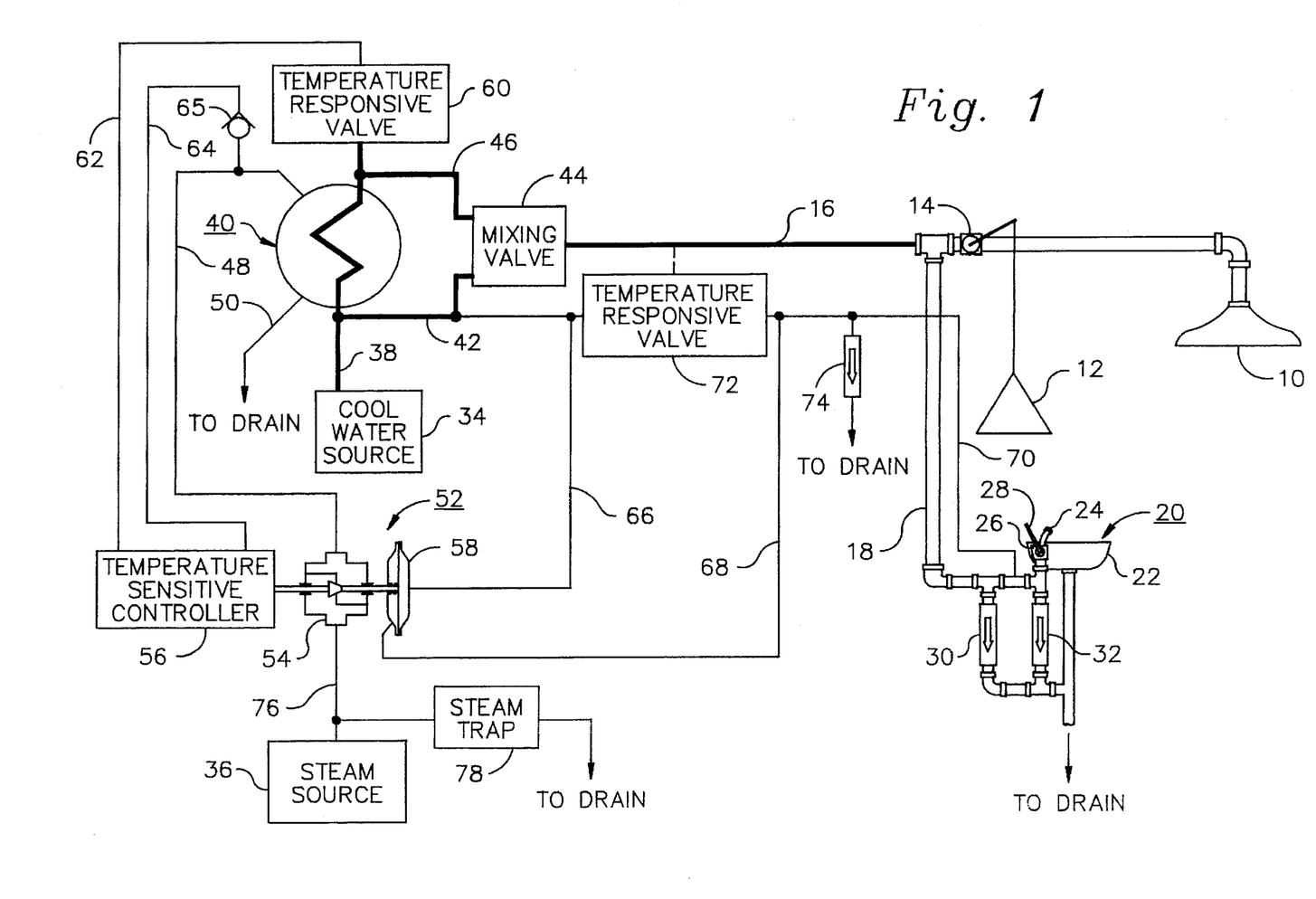
FIG. 1 is a schematic diagram showing a combined eyewash and safety shower embodying the invention.

In FIG. 1, the safety shower comprises a shower head 10 and a pull-chain 12 arranged to operate a normally closed shut-off valve 14, which controls the flow of water to the shower head from a warm water line 16. The same line is connected through a conduit 18 to an eyewash apparatus 20 in which a basin 22 has mounted on it a pair of nozzles, one of which is shown at 24. Flow of water to these nozzles is controlled by a valve 26 operated by a forehead-actuated bar 28.

The water flow rate in a typical safety shower is several times the water flow rate in a typical eyewash. The flow rate through the shower can be as high as 30 gallons per minute (g.p.m.), while the flow rate through an eyewash can be as low as 3 g.p.m.

The water conduit 18 is connected to a drain line through a heat-actuated overtemperature valve 30 and through a temperature-responsive freeze protection valve 32. Each valve opens to release water from the system when the temperature of the water on its inlet side reaches a predetermined limit. In the case of an excessive temperature, the release of the hot water through valve 30 to the drain prevents hot water from flowing through the eyewash or shower. When freezing temperatures are encountered, the freeze protection valve 32 bleeds water from the water delivery conduits, causing water to flow through the conduits slowly, and thereby prevent ice from forming in the conduits and causing damage. These valves can be made in accordance with U.S. Pat. No. 4,883,082, which describes a thermally actuated, in-line valve structure which can be utilized in either of valves 30 and 32. It also describes a combination overtemperature and freeze protection valve which can be used in place of valves 30 and 32. The disclosure of U.S. Pat. No. 4,883,082 is incorporated here by reference.

Water for the safety shower and eyewash is derived from a cool water source 34, which can be the existing plant water supply. Steam for heating the water is derived from a steam source 36, which can be an existing plant steam supply.

The cool water source is connected through a water line 38 to the water inlet of a heat exchanger 40, and through water line 42 to one of two inlets of a mixing valve 44. The water outlet of the heat exchanger is connected to the other inlet of the mixing valve through a line 46.

The heat exchanger 40 can be any of various kinds of heat exchangers suitable for use with steam and water. A preferred heat exchanger is a brazed-plate heat exchanger of the kind commonly used in heat pumps, air-conditioners, refrigeration systems and water coolers. The typical brazed-plate heat exchanger comprises a stack of pattern-embossed metal plates with manifolding arranged so that the two fluids flow counter-current to each other. This kind of heat exchanger is advantageous because of its compactness and high efficiency.

Steam from steam source 36 is fed to the heat exchanger through line 48, and condensate exits the heat exchanger to a drain through line 50. Flow of steam in line 48 to the heat exchanger is controlled by a valve assembly 52, which comprises a valve 54, operated both by a temperature sensitive controller 56 and by a diaphragm actuator 58.

A by-pass path for the flow of water from the outlet of the water path in the heat exchanger to the inlet of the steam path of the heat exchanger is provided by a temperature-responsive valve 60, line 62, controller 56, line 64 and check valve 65.

One of the two internal chambers of the diaphragm actuator 58 is connected to the cool water source through line 66 and lines 42 and 38. The other chamber is connected to the eyewash branch of the warm water delivery path through line 68. The connection of line 70 to the eyewash branch of the warm water path is made at a point near the eyewash apparatus, as shown in FIG. 1. A temperature responsive valve 72 is connected between lines 66 and 68, and is responsive to temperature within warm water line 16. The valve is openable to equalize the pressures on both sides of the diaphragm in diaphragm actuator 58. Line 70 is provided with a freeze protection valve 74, similar to freeze protection valve 32.

Line 76, which connects Steam source 36 to the inlet of the steam valve 54, is connected through a steam trap 78 to a drain. The steam trap is preferably a "subcooling" steam trap which releases condensate when the condensate is at a temperature lower than a predetermined temperature between ambient and 212° F., for example 155° F. This allows warm condensate to accumulate in the line 76 between the steam source 36 and the steam valve 54. Preferably, the steam trap or line 76 is positioned in close proximity to the mixing valve 44, so that heat from the accumulated warm condensate is conducted to the mixing valve. The heat from the accumulated condensate keeps the mixing valve in a warm condition so that its cool water inlet port is partly open. This prevents temperature spikes in the water at the outlet of the mixing valve, which could otherwise occur when the shower or eyewash valves are opened. The steam trap can be any of a variety of well-known devices for eliminating condensate while preventing excessive amounts of steam from escaping, and can be either the subcooling type, or a conventional steam trap capable of eliminating very hot condensate. The in-line valve shown and described in U.S. Pat. No. 4,883,082 can be used for steam trap 78, if the high-temperature actuator is eliminated and the low temperature actuator is chosen so that it operates at a higher temperature, for example 155° F.

The mixing valve

Figure 3:
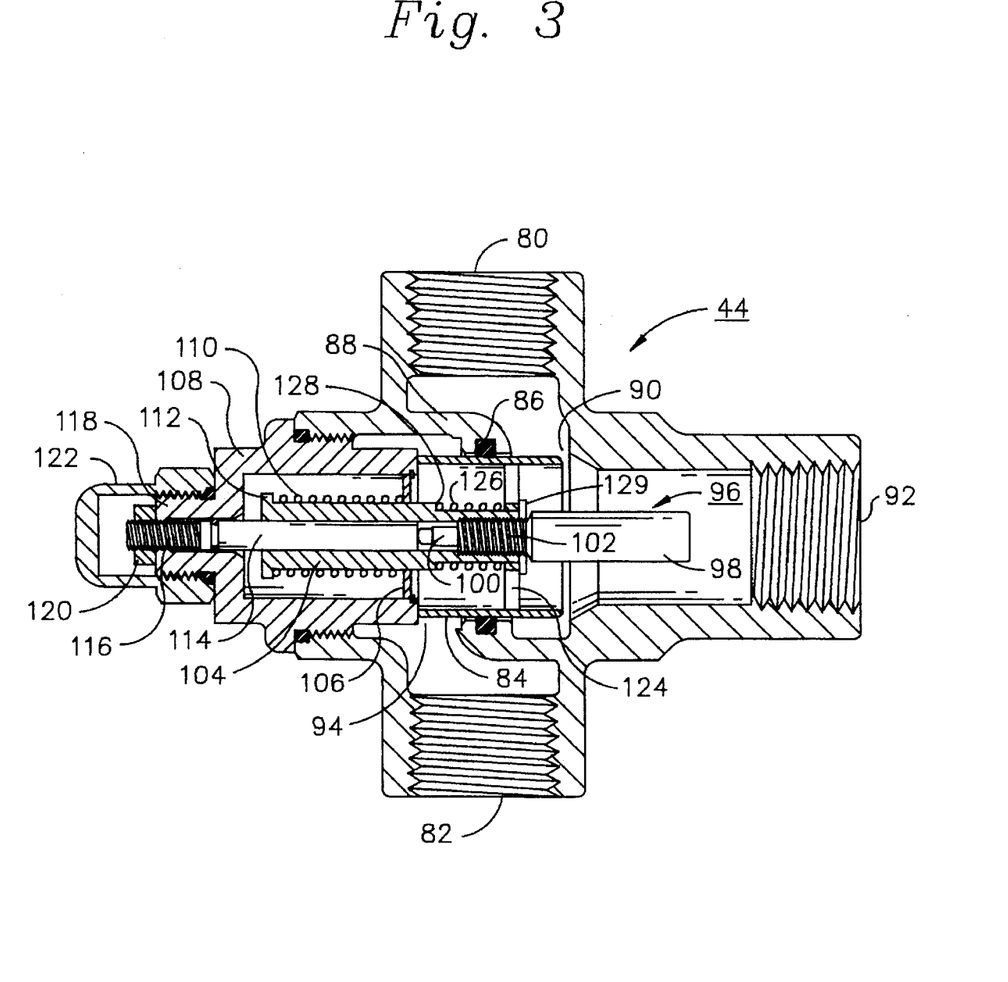
FIG. 3 is a cross-sectional view of the mixing valve of FIG. 1.

The mixing valve 44 is a temperature-responsive proportioning valve for mixing cool and heated water and delivering a temperature-regulated flow of water to an outlet. Details of mixing valve 44 are shown in FIG. 3.

The mixing valve receives heated water from the heat exchanger through line 46 (FIG. 1) and inlet 80, and cool water from the cool water source 34 (FIG. 1) through line 42 and inlet 82. A hollow, cylindrical valve element 84 is axially slidable through an 0-ring seal 86 in a baffle 88. The baffle provides a first passage 90, for the flow of heated water to outlet 92, and a second passage 94, for the flow of cool water to outlet 92. The outlet, 92 is connected to line 16 (FIG. 1). The proportions of cool and heated water delivered through outlet 92 are determined by the position of valve element 84, which is shown in FIG. 3 in position to shut off the cool water passage 94 completely, and to open heated water passage 90 to its maximum aperture.

A thermal actuator 96 is provided within mixing valve 44. This actuator is preferably a wax-filled thermal actuator having a body 98 containing a wax, formulated so that it melts and expands at a predetermined temperature. A piston 100 extends into the actuator body through a neck 102 having mounting threads. The piston is separated from the wax by an elastomeric seal (not shown), and is pushed outward by the wax as the wax expands.

Actuator 96 is threaded into a sleeve 104, which extends through a plate 106 in a plug 108 threaded into the end of the housing of the mixing valve opposite to outlet 92. A coil spring 110, in compression between plate 106 and a shoulder 112 of sleeve 104, urges the sleeve leftward. The plug has a cylindrical interior, which receives a rod 114. A threaded end 116 of the rod engages internal threads formed within an opening at end 118 of the plug 108, and is locked by a nut 120, covered by a protective cap 122. The other end of rod 114 is engaged by the tip of the actuator piston 100, and the position of the sleeve 104 (and the actuator which it carries) can be adjusted by removing cap 122, loosening locking nut 120, and rotating rod 114.

The end of sleeve 104 remote from its shoulder 112 extends through a spider 124, which is fixed to the interior of valve element 84. A second coil spring 126 is in compression between a shoulder 128 and the spider 124, and the spring holds the spider against a washer 129, which is secured to the end of the sleeve 104 by the actuator body 98.

In the operation of the mixing valve, the actuator 96 senses the temperature of the water being delivered through outlet passage 92. Initially, the temperature of the water delivered by the heat exchanger through its warm water outlet line 46 will not be high, and consequently, the valve element 84 will normally be positioned as shown, with cool water passage 94 closed. However, heat conducted to the mixing valve from the adjacent steam line or steam trap will cause the mixing valve element 84 to open the cool water port 82 partly and throttle down the heated water inlet port 80. This occurs because, as heat is conducted to the mixing valve the actuator body 98 becomes warmer, and, as the wax in the actuator melts, it expands, pushing the actuator piston 100 outward against the end of rod 114. This causes the assembly comprising sleeve 104, actuator 96 and valve element 84 to move to the right, opening up cool water passage 94 and closing down heated water passage 90. Therefore, when steam is present and the apparatus is ready for operation, the mixing valve element will be in an intermediate position, and, upon a demand for water, cool water will flow through the mixing valve along with warm water, thereby avoiding temperature spikes in the water at the outlet of the mixing valve.

The temperature of the water in the heated water passage 90 of the mixing valve directly affects the actuator 98. When the temperature of the water passing through the heated water passage 90 increases, the actuator body 98 becomes warmer, and piston 100 pushes against the end of rod 114, causing valve element 84 to move to the right, opening up cool water passage 94 and closing down heated water passage 90. The position of the piston varies from fully extended to fully retracted within a narrow band of temperatures. Consequently, the valve element will seek and equilibrium position in which the proportion of heated water to cold water produces a flow through outlet 92 at a temperature within the narrow band of temperatures at which the actuator piston moves from its fully retracted to its fully extended position. Spring 110 causes the valve element to move to the left when the piston retracts as the actuator cools down. If the temperature of the water entering the mixing valve becomes very high, valve element 84 can move to its rightmost limit, closing off the heated water passage 90 altogether. When this occurs, spring 126 compresses, thereby preventing excessive forces from being exerted on the piston and causing damage to the actuator.

The temperature of the water delivered though outlet 92 of the mixing valve is preferably held at 85° F., and the wax formulation in the actuator is selected, and rod 114 is adjusted, to cause the mixing valve to regulate the temperature of the water at this temperature.

As will be seen from the following description of the heat exchanger by-pass path, the temperature of the heated water delivered by the heat exchanger to the mixing valve is limited to 105° F. The temperature of the cool water supplied to the mixing valve can vary over a wide range, especially in an outdoor environment. However, the mixing valve is capable of regulating the temperature of the water at the mixing valve outlet by proportioning the heated and cool water mixture in accordance with the following table.

| Temperature of cool water (°F.) | Ratio of 105° water to cool water (approximate volume rate of flow) |
| --- | --- |
| 40° | 7:3 |
| 60° | 5.6:4.4 |
| 70° | 4.3:5.7 |
| 80° | 2:8 |

The heat exchanger by-pass valve

Figure 5:
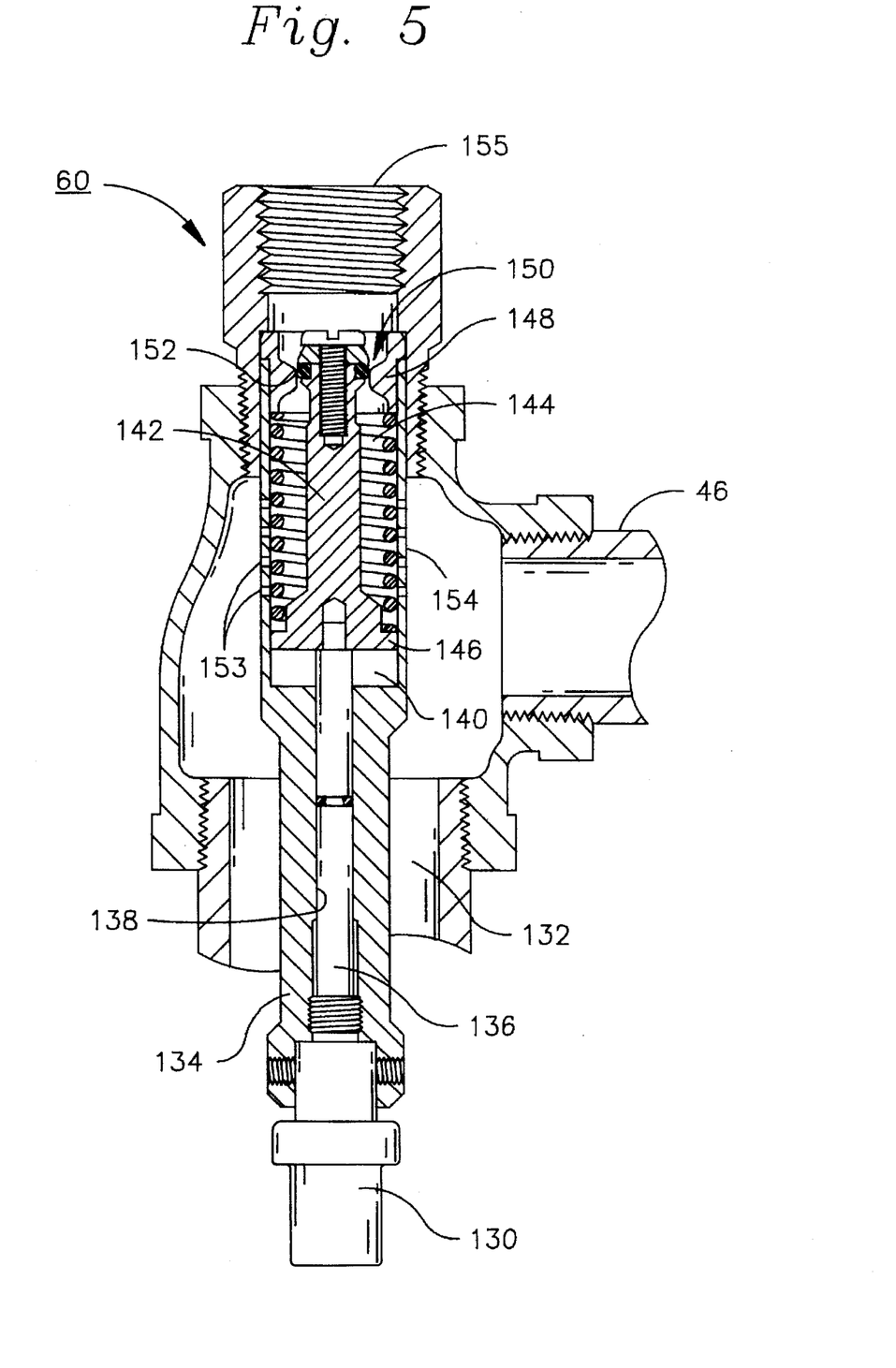
FIG. 5 is a cross-sectional view showing details of a temperature responsive valve at the water outlet of the heat exchanger of FIG. 1.

FIG. 5 shows the details of the temperature-responsive, heat exchanger by-pass valve 60.

This valve is built into the heated water outlet of the heat exchanger, and utilizes a thermally responsive wax actuator 130, which extends through the heated water outlet opening 132 of the heat exchanger so that it is in contact with the heated water before the heated water reaches warm water line 46, which leads to the mixing valve.

The actuator body is mounted at the lower end of a tube 134, and the piston 136 of the actuator extends, through a hollow passage 138 of the tube, into a chamber 140, where it is engaged with a valve element 142. The valve element is urged downward by a coil spring 144, held in compression between a shoulder 146 of the valve element and an insert 148, which defines a narrow passage 150. A resilient annular sealing ring 152, mounted at the upper end of the valve element 142, cooperates with the wall of insert 148 to close the passage 150. Radial openings 153 in the wall 154 of chamber 140 permit water to flow into the chamber so that, when the actuator piston 136 pushes the valve element upward to open passage 150, warm water from the heat exchanger can flow through outlet 155 into line 62.

Preferably, the actuator 130 is designed to open valve passage 150 when the temperature of the water at the heated water outlet of the heat exchanger reaches 105° F. When the valve passage 150 opens, water flows through line 62, temperature sensitive controller 56, line 64 and check valve 65, to the steam inlet of the heat exchanger. The water entering the steam line through check valve 65 comes into contact with the steam, removing heat from the steam as it enters the heat exchanger. This rapidly spoils the operation of the heat exchanger and limits the temperature of the heated water at the outlet of the heat exchanger to 105° F.

The heat-exchanger by-pass path also opens if water at the outlet of the heat exchanger is heated excessively by exposure to sunlight.

The steam valve

Figure 4:
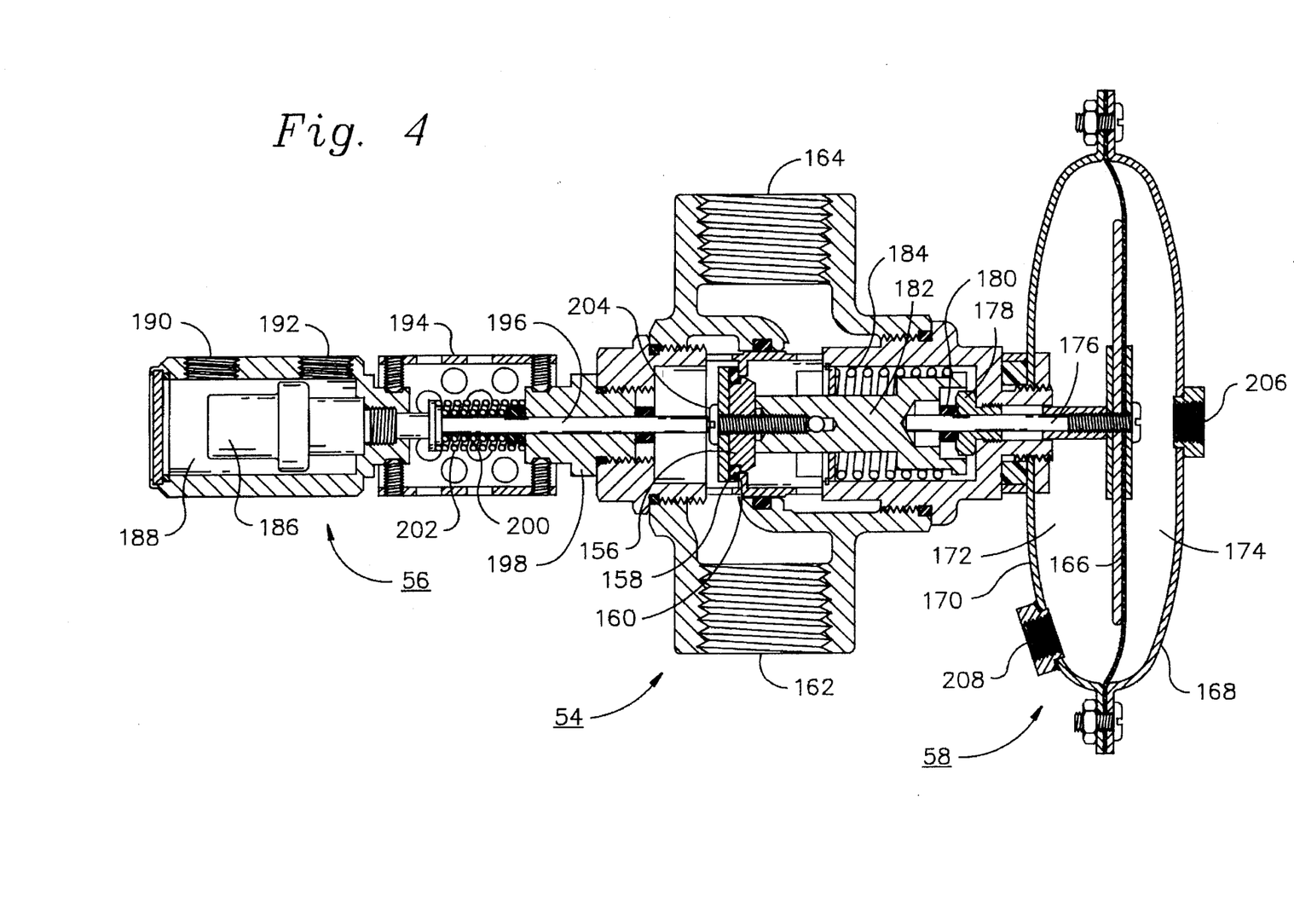
FIG. 4 is a cross-sectional view showing details of a steam valve assembly shown in FIG. 1.

As shown in FIG. 4, the steam valve 54 comprises a cylindrical valve element 156, carrying a resilient, annular seal 158 which cooperates with a shoulder 160, which serves as a valve seat. The valve element is shown in its closed condition. When it opens, by moving to the left, steam can flow from the steam inlet 162 to steam outlet 164. The valve element is controlled both by diaphragm actuator 58 and by temperature-sensitive controller 56.

The diaphragm 166 is fastened between the two halves 168 and 170 of actuator shell, to define two chambers 172 and 174. A stem 176 is attached to the diaphragm and extends through a bushing 178 and a seal 180 to engage a spring-loaded member 182 to which the valve element 156 is attached. Coil spring 184 continuously urges the valve element toward its closed condition. The diaphragm actuator pushes the valve element open when the pressure in chamber 172 falls sufficiently below the pressure in chamber 174 to overcome the force exerted by spring 184.

The temperature-sensitive controller 56 comprises a thermally responsive wax actuator 186 mounted in a chamber 188 having an inlet port 190 connected to line 62 (FIG. 1) and an outlet port 192 connected to line 64. The chamber, therefore, forms part of the heat exchanger by-pass path.

The piston of the actuator extends into an apertured protective housing 194, in which it engages an end of an axially slidable rod 196. The rod is slidable through a bushing 198 and urged against the actuator piston by coil spring 200 and 202. The rod 196 engages the head of a screw 204, which is fastened to the valve element 156. The apertures in the protective housing 194 allow ambient air to cool the rod 196 so that the heat of the steam in the steam valve does not excessively heat the piston of the actuator.

In the operation of the steam valve, the diaphragm actuator senses a demand for water because a demand produces a pressure difference across the diaphragm. The pressure in chamber 174 corresponds to the water pressure at the outlet of the cool water source, there being a connection through line 66 (FIG. 1) to the chamber 174 through port 206. The other chamber, 172, is connected through port 208 (FIG. 4) and line 68 to water conduit 18, at a point near the eyewash. When the eyewash valve 26 is opened, or when the shower valve 14 is opened, a pressure drop occurs in the water path between the cool water source and the valve. This pressure drop occurs because the water path inherently restricts flow of water. When the pressure drop occurs, diaphragm 166 moves to the left, and its stem 176 pushes member 182 against the force exerted by spring 184 to move valve element 156 away from shoulder 160. This allows steam to flow through the valve to the heat exchanger, and steam immediately warms the water flowing through line 46 to the mixing valve. When the eyewash and shower valves are both closed, the pressures on both sides of the diaphragm in actuator 58 equalize, and the steam valve is closed by spring 184.

The steam trap 78 (FIG. 1) insures that condensate is removed from line 76 so that steam is available to the heat exchanger immediately when a demand for warm water is sensed by the diaphragm actuator.

The sensing connection through lines 68 and 70 is near the eyewash valve because the flow rate through the eyewash is lower than the flow rate through the shower. By making the connection near the eyewash, the diaphragm actuator responds similarly to opening of the shower valve and to opening of the eyewash valve.

Because the diaphragm actuator is responsive to a pressure differential along a water delivery path, it automatically compensates for variations in the water supply pressure. The diaphragm actuator also insures that the steam valve is closed if the supply of cool water is interrupted, and keeps the steam valve closed until the supply of cool water is re-established.

The temperature-sensitive controller 56, which also operates the steam valve, overrides the diaphragm actuator, and closes off the steam valve when hot water flows through the heat-exchanger by-pass path, which includes line 62, controller 56 and line 64.

Controller 56 insures that the steam supply is cut off when the temperature of the water in line 46 at the outlet of the heat exchanger reaches 105° F.

Temperature-responsive disabling of demand sensor

Figure 2:
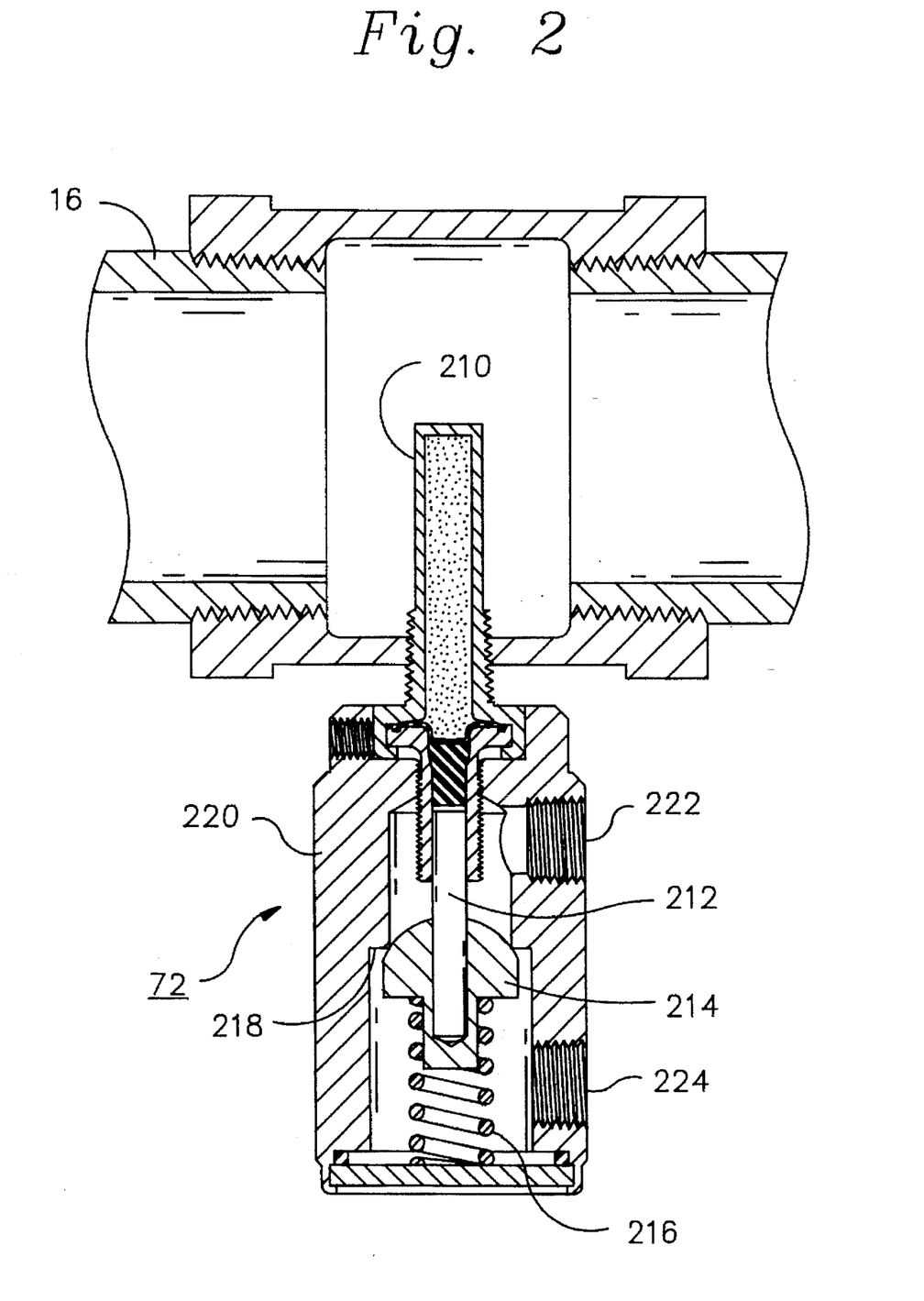
FIG. 2 is a cross-sectional view of a temperature sensitive valve for controlling the flow of steam in response to the temperature of water at the outlet of a mixing valve shown diagrammatically in FIG. 1.

Temperature responsive valve 72 (FIG. 1) is shown in detail in FIG. 2. It includes a thermally responsive wax actuator 210, the body of which extends into water line 16. Its piston 212 pushes a valve element 214 against a spring 216 away from a seat formed by a shoulder 218 in a valve body 220. Ports 222 and 224 in the valve body are connected respectively to lines 66 and 68 (FIG. 1).

Normally, the valve element 214 is held against shoulder 218, cutting off communication between ports 222 and 224. However, if the temperature of the water in line 16 exceeds a predetermined limit (e.g. 85° F.), actuator 210 will move valve element 214 away from its seat to provide a direct path for communication between chambers 172 and 174 of the diaphragm actuator (FIG. 4). When this occurs, the pressures on both sides of the diaphragm are equalized, and the steam valve is closed by spring 184 (FIG. 4). Thus temperature responsive valve 72 provides an additional measure of safety.

Summary

The apparatus depicted in FIG. 1 has several temperature control devices all of which cooperate to insure that the temperature of the water delivered to the eyewash and shower will not exceed a predetermined safe limit (e.g. 85° F.). The mixing valve 44 provides a first level of protection because it throttles down heated water, and can close off the heated water flow through line 46 altogether, if the water in that line becomes too hot. The principle safety feature, however, is the temperature responsive valve 60, which causes water to flow from the heated water outlet of the heat exchanger into the steam inlet of the heat exchanger when the water at the heat exchanger outlet becomes too hot. A still further measure of safety is provided by temperature-sensitive controller 56, which shuts off the steam supply to the heat exchanger in response to a high temperature in the heat exchanger by-pass path. Temperature responsive valve 72 also causes the steam valve to shut off the steam supply to the heat exchanger in response to excessive temperatures in the water delivery path. Finally, valve 30 opens if the water in line 18 becomes too hot, thereby causing the hot water to flow to the drain and purge the line of hot water.

The apparatus is capable of taking in water over a wide range of temperatures and pressures, and delivering water at a well-regulated temperature over a wide range of flow rates, so that it can feed either a shower or an eyewash station, using the same heat exchange equipment.

Various modifications can be made to the apparatus described. For example, it is possible to eliminate one or more of the several redundant temperature-limiting features of the apparatus of FIG. 1. Additionally, while the several valves, such as the temperature-responsive valve 60 in the heat exchanger by-pass path, are shown and described as capable of closing completely, it is possible to utilize valves which merely throttle down flow but do not close completely. The term "increase," when used in the claims with reference to "flow," encompasses an increase from zero flow as well as and increase from a low, non-zero flow rate. The water demand sensing lines 66 and 68, while preferably connected to the inlet of the mixing valve through the cool water inlet line 42 and to the outlet of the mixing valve through lines 68, 70, 18 and 16, can be connected to the mixing valve at various other points in the system. Furthermore, various alternative types of flow sensors, such as flowmeters or flow restricting orifices, can be used.

These and other modifications can be made without departing from the scope of the invention as defined in the following claims.

I claim:

1. Apparatus for delivering water at a controlled temperature comprising:
    a heat exchanger having a water path, a steam path separate from the water path, and means for transferring heat from the steam path to the water path, each said path having an inlet and an outlet;
    means for feeding cool water from a water supply to the inlet of the water path of the heat exchanger;
    means for feeding steam to the inlet of the steam path of the heat exchanger;
    means providing a by-pass path for the flow of water from the outlet of the water path of the heat exchanger to the inlet of the steam path of the heat exchanger; and
    temperature-responsive valve means, in the by-pass path, for causing an increase in the rate of flow of water through said by-pass path from the outlet of the water path of the heat exchanger to the inlet of the steam path of the heat exchanger when the temperature of the water at the outlet of the water path of the heat exchanger exceeds a predetermined limit temperature; whereby the operation of the heat exchanger is rapidly spoiled when the temperature of the water at the outlet of the water path of the heat exchanger exceeds said predetermined limit temperature.

2. Apparatus for delivering water at a controlled temperature comprising:
    a heat exchanger having a water path, a steam path separate from the water path, and means for transferring heat from the steam path to the water path, each said path having an inlet and an outlet;
    means for feeding cool water from a water supply to the inlet of the water path of the heat exchanger;
    means for feeding steam to the inlet of the steam path of the heat exchanger;
    combining means, connected to the cool water feeding means and to the outlet of the water path of the heat exchanger, for combining cool water with heated water from the outlet of the water path and delivering warm water resulting from the combination of said cool water and heated water;
    means for selectably controlling flow of warm water from the combining means whereby the warm water can flow at least at two different flow rates;
    means providing a by-pass path for the flow of water from the outlet of the water path of the heat exchanger to the inlet of the steam path of the heat exchanger; and
    temperature-responsive valve means, in the by-pass path, for causing an increase in the rate of flow of water through said by-pass path from the outlet of the water path of the heat exchanger to the inlet of the steam path of the heat exchanger when the temperature of the water at the outlet of the water path of the heat exchanger exceeds a predetermined limit temperature; whereby the operation of the heat exchanger is rapidly spoiled when the temperature of the water at the outlet of the water path of the heat exchanger exceeds said predetermined limit temperature, and the temperature of the warm water delivered by the combining means is less sensitive to the rate of flow of said warm water and therefore more easily regulated.

3. Apparatus according to claim 2 in which the means for selectably controlling flow of warm water from the combining means comprises:
    means providing a first delivery path connected to receive warm water from the combining means, and including a first shut-off valve, for delivering the warm water at a first flow rate; and
    means providing a second delivery path connected to receive warm water from the combining means, and including a second shut-off valve, for delivering the warm water at a second flow rate different from said first flow rate.

4. Apparatus according to claim 3 in which the means providing a first delivery path is a safety shower and the means providing a second delivery path is an eye-wash station.

5. Apparatus according to claim 2 in which the combining means includes regulating means for sensing the temperature of the warm water delivered by the combining means and controlling the ratio of the flow rates of the heated and cool water combined by the combining means in order to maintain the warm water delivered by the combining means at a substantially constant temperature.

6. Apparatus according to claim 2 in which the combining means is a mixing valve having means for regulating the ratio of the flow rates of the heated and cool water combined by the combining means in order to maintain the warm water delivered by the combining means at a substantially constant temperature.

7. Apparatus according to claim 2 including demand sensing means, connected to the combining means, for sensing the demand for warm water, and means, responsive to said demand sensing means, for controlling said steam feeding means so that the amount of steam fed to the heat exchanger increases when a demand for warm water occurs.

8. Apparatus according to claim 2 including means, responsive to the temperature of water delivered through the outlet of the water path of the heat exchanger, for reducing the flow of steam to the inlet of the steam path of the heat exchanger when the temperature of said water delivered through the outlet of the water path of the heat exchanger exceeds a predetermined temperature.

9. Apparatus according to claim 2 including means, responsive to the temperature of water in said by-pass path, for reducing the flow of steam to the inlet of the steam path of the heat exchanger when the temperature of the water in the by-pass path exceeds a predetermined temperature.

10. Apparatus according to claim 2 including steam valve means arranged to control the flow of steam to the inlet of the steam path of the heat exchanger, demand sensing means, connected to the combining means, for sensing the demand for warm water, first means, responsive to said demand sensing means, for controlling said steam valve means so that the amount of steam fed to the heat exchanger increases when a demand for warm water occurs, and second means, responsive to the temperature of water delivered through the outlet of the water path of the heat exchanger, for controlling the steam valve means to reduce the flow of steam to the inlet of the steam path of the heat exchanger when the temperature of the water delivered through the outlet of the water path of the heat exchanger exceeds a predetermined temperature.

11. Apparatus according to claim 10 in which said steam valve means is a single valve controlled both by said first means and by said second means, and in which said second means is capable of overriding said first means to close the steam valve while said demand sensing means is sensing a demand for warm water.

12. Apparatus according to claim 2 including a source of steam, steam valve means for controlling the flow of steam to the inlet of the steam path of the heat exchanger, said steam valve means having an inlet, means for conducting steam from said source to said inlet of the steam valve means and steam trap means, connected to said conducting means, for eliminating condensate from said conducting means, whereby, upon opening of said steam valve means, steam is able to flow substantially immediately to the heat exchanger.

13. Apparatus for delivering water at a controlled temperature comprising:
 a heat exchanger having a water path, a steam path separate from the water path, and means for transferring heat from the steam path to the water path, each said path having an inlet and an outlet;
 means for feeding cool water from a water supply to the inlet of the water path of the heat exchanger;
 means for feeding steam to the inlet of the steam path of the heat exchanger;
 combining means, connected to the cool water feeding means and to the outlet of the water path of the heat exchanger, for combining cool water with heated water from the outlet of the water path and delivering warm water resulting from the combination of said cool water and heated water;
 means for selectably controlling flow of warm water from the combining means whereby the warm water can flow at least at two different flow rates;
 regulating means for sensing the temperature of the warm water delivered by said combining means and for controlling the ratio of the flow rates of the heated and cool water combined by said combining means in order to maintain the warm water delivered by the combining means at a substantially constant temperature; and
 temperature-responsive means, for sensing and limiting the temperature of the heated water delivered through the outlet of the water path of the heat exchanger before said heated water reaches the combining means.

14. Apparatus according to claim 13 in which the means for feeding steam to the inlet of the steam path of the heat exchanger includes means in proximity to the regulating means, for causing the heat from fluid in the steam path to heat the regulating means, whereby, upon operation of the means for selectably controlling flow of warm water when a demand for warm water occurs, cool water from the cool water feeding means flows immediately into the combining means and combines with warm water therein.

15. Apparatus for delivering water at a controlled temperature comprising:
 a heat exchanger having a water path, a steam path separate from the water path, and means for transferring heat from the steam path to the water path, each said path having an inlet and an outlet;
 means for feeding cool water from a water supply to the inlet of the water path of the heat exchanger;
 means for feeding steam to the inlet of the steam path of the heat exchanger;
 combining means, connected to the cool water feeding means and to the outlet of the water path of the heat exchanger, for combining cool water with heated water from the outlet of the water path and delivering warm water resulting from the combination of said cool water and heated water to a warm water delivery path;
 means for regulating the temperature of water delivered by said combining means; and
 means, responsive to a demand for warm water in the warm water delivery path, for preventing flow of steam to the heat exchanger when there is no demand for warm water, but allowing flow of steam to the heat exchanger when a demand for warm water occurs.

16. Apparatus for delivering water at a controlled temperature comprising:
 a heat exchanger having a water path, a steam path separate from the water path, and means for transferring heat from the steam path to the water path, each said path having an inlet and an outlet;
 means for feeding cool water from a water supply to the inlet of the water path of the heat exchanger;
 means for feeding steam to the inlet of the steam path of the heat exchanger, including steam valve means for controlling the flow of steam to said inlet of the steam path;
 combining means, connected to the cool water feeding means and to the outlet of the water path of the heat exchanger, for combining cool water with heated water from the outlet of the water path and delivering warm water resulting from the combination of said cool water and heated water through a warm water delivery path;
 means for regulating the temperature of water delivered by said combining means;
 demand sensing means, connected to the combining means, for sensing the demand for warm water in the warm water delivery path;
 first means, responsive to said demand sensing means, for controlling said steam valve means so that the amount of steam fed to the heat exchanger increases when a demand for warm water occurs; and
 second means, responsive to the temperature of water delivered through the outlet of the water path of the heat exchanger, for controlling the steam valve means to reduce the flow of steam to the inlet of the steam path of the heat exchanger when the temperature of the water delivered through the outlet Of the water path of the heat exchanger exceeds a predetermined temperature.

17. Apparatus according to claim 16 in which said steam valve means is a single valve controlled both by said first means and by said second means, and in which said second means is capable of overriding said first means to close the steam valve while said demand sensing means is sensing a demand for warm water.

18. Apparatus according to claim 17 in which said demand sensing means comprises a flow restriction in the path of flow of water from the water supply to the warm water delivery path, and in which the first means, is a diaphragm control responsive to a pressure drop across said flow restriction.

19. Apparatus according to claim 18 in which the steam valve means comprises a valve element actuable both by said first means and by said second means, and in which said second means is a thermal actuator capable of exerting a force on the valve element greater than the force exerted on the valve element by the first means.

20. Apparatus according to claim 18 in which the diaphragm control comprises an enclosure having an interior space with a diaphragm dividing the interior space into two chambers, in which the two chambers are connected to the water path respectively on both sides of said restriction, and in which the diaphragm is connected to operate the steam valve means, said apparatus also including temperature-responsive valve means, responsive to the temperature of water in the warm water delivery path, for opening a path from one of said two chambers to the other to equalize the pressure across said diaphragm when the temperature sensed by the temperature-responsive valve means exceeds a predetermined limit temperature.

21. Apparatus for delivering water at a controlled temperature comprising:

a heat exchanger having a water path, a steam path separate from the water path, and means for transferring heat from the steam path to the water path, each said path having an inlet and an outlet;

means for feeding cool water from a water supply to the inlet of the water path of the heat exchanger;

means for feeding steam to the inlet of the steam path of the heat exchanger; and means, connected to the water path of the heat exchanger and responsive to the temperature of the water in the heat exchanger, for causing water to flow into the steam path of the heat exchanger when the temperature of the water in the heat exchanger exceeds a predetermined level, whereby the operation of the heat exchanger is rapidly spoiled when the temperature of the water in the heat exchanger exceeds said predetermined level.

22. Apparatus according to claim 21 including combining means, connected to the cool water feeding means and to the outlet of the water path of the heat exchanger, for combining cool water with heated water from the outlet of the water path and delivering warm water resulting from the combination of said cool water and heated water to a warm water delivery path; and means for regulating the temperature of water delivered by said combining means.

* * * * *